United States Patent
Boyer et al.

(10) Patent No.: US 11,741,167 B2
(45) Date of Patent: *Aug. 29, 2023

(54) MERGING POINT-OF-INTEREST DATASETS FOR MAPPING SYSTEMS

(71) Applicant: Verizon Patent and Licensing Inc., Basking Ridge, NJ (US)

(72) Inventors: Wesley Boyer, Denver, CO (US); Aleksei Maximillian Kac, Parker, CO (US); Mark Romanak, Lone Tree, CO (US); Thomas M. Baker, Jr., Denver, CO (US); Jeremy McKay, Denver, CO (US); Jared David Barnes, Denver, CO (US); Rossi Guiliani, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,065

(22) Filed: Mar. 23, 2022

(65) Prior Publication Data

US 2022/0215054 A1 Jul. 7, 2022

Related U.S. Application Data

(63) Continuation of application No. 16/396,166, filed on Apr. 26, 2019, now Pat. No. 11,308,165.

(51) Int. Cl.
| | |
|---|---|
| *G06F 16/906* | (2019.01) |
| *G06F 16/687* | (2019.01) |
| *G06F 16/75* | (2019.01) |
| *G06F 16/2457* | (2019.01) |
| *G06F 16/22* | (2019.01) |

(52) U.S. Cl.
CPC .......... *G06F 16/906* (2019.01); *G06F 16/687* (2019.01); *G06F 16/75* (2019.01); *G06F 16/22* (2019.01); *G06F 16/2457* (2019.01)

(58) Field of Classification Search
CPC .... G06F 16/906; G06F 16/22; G06F 16/2457; G06F 16/75; G06F 16/687
USPC ......................................................... 707/737
See application file for complete search history.

(56) References Cited

U.S. PATENT DOCUMENTS

| | | | |
|---|---|---|---|
| 9,760,718 B2 * | 9/2017 | Braghin | G06F 16/215 |
| 10,452,625 B2 | 10/2019 | Mukherjee et al. | |
| 10,467,201 B1 | 11/2019 | Merritt et al. | |
| 2004/0139072 A1 * | 7/2004 | Broder | G06F 16/284 |
| 2006/0149674 A1 | 7/2006 | Cook et al. | |
| 2008/0313239 A1 * | 12/2008 | Byler | G06Q 30/02 |
| 2016/0092772 A1 | 3/2016 | Srivastava et al. | |

(Continued)

*Primary Examiner* — Shahid A Alam

(57) ABSTRACT

An illustrative computing system generates, based on a plurality of point-of-interest data records each including data representative of a distinct set of features for a distinct point-of-interest associated with a distinct geographic location, a graph data structure that includes the plurality of point-of-interest data records and a plurality of weighted feature relationships interconnecting the plurality of point-of-interest data records. The computing system generates one or more merged point-of-interest data records based on the graph data structure and provides the one or more merged point-of-interest data records to a mapping system to indicate one or more points-of-interest on a user interface map of a geographic area.

20 Claims, 9 Drawing Sheets

(56) References Cited

U.S. PATENT DOCUMENTS

| | | | |
|---|---|---|---|
| 2017/0076295 A1* | 3/2017 | Vasudev | G06F 16/22 |
| 2017/0091274 A1* | 3/2017 | Guo | G06F 16/24544 |
| 2018/0025093 A1* | 1/2018 | Xia | G06F 16/9024 |
| | | | 707/602 |
| 2019/0171732 A1* | 6/2019 | Yanez | G06N 20/20 |
| 2019/0361876 A1* | 11/2019 | Rogynskyy | H04L 41/082 |
| 2019/0378163 A1 | 12/2019 | Sussman et al. | |

\* cited by examiner

MERGING POINT-OF-INTEREST DATASETS FOR MAPPING SYSTEMS

RELATED APPLICATIONS

This application is a continuation application of U.S. patent application Ser. No. 16/396,166, filed Apr. 26, 2019, and entitled "Methods and Systems for Merging Point-of-Interest Datasets," which is hereby incorporated by reference in its entirety.

BACKGROUND INFORMATION

Computer-implemented mapping systems may indicate points-of-interest such as businesses, parks, transit stations, etc. on a user interface map of a geographic area. To curate point-of-interest data to be used to indicate points-of-interest on a user interface map, a mapping service provider typically receives point-of-interest datasets from multiple sources, identifies, from the point-of-interest datasets, matching points-of-interest (e.g., duplicate points-of-interest), and combines matched points-of-interest to form a merged point-of-interest dataset that is used by a computer-implemented mapping system to indicate points-of-interest on the user interface map.

Computer-implemented technologies have been built to automatically identify matching points-of-interest across different point-of-interest datasets. Traditionally, however, automatic and accurate identification of matching points-of-interest across different point-of-interest datasets is technically challenging and inefficient at least because of the large amounts of data being processed and variations in information across the different point-of-interest datasets. There remains room to improve computer-implemented technologies for automatically identifying matching points-of-interest across different point-of-interest datasets.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
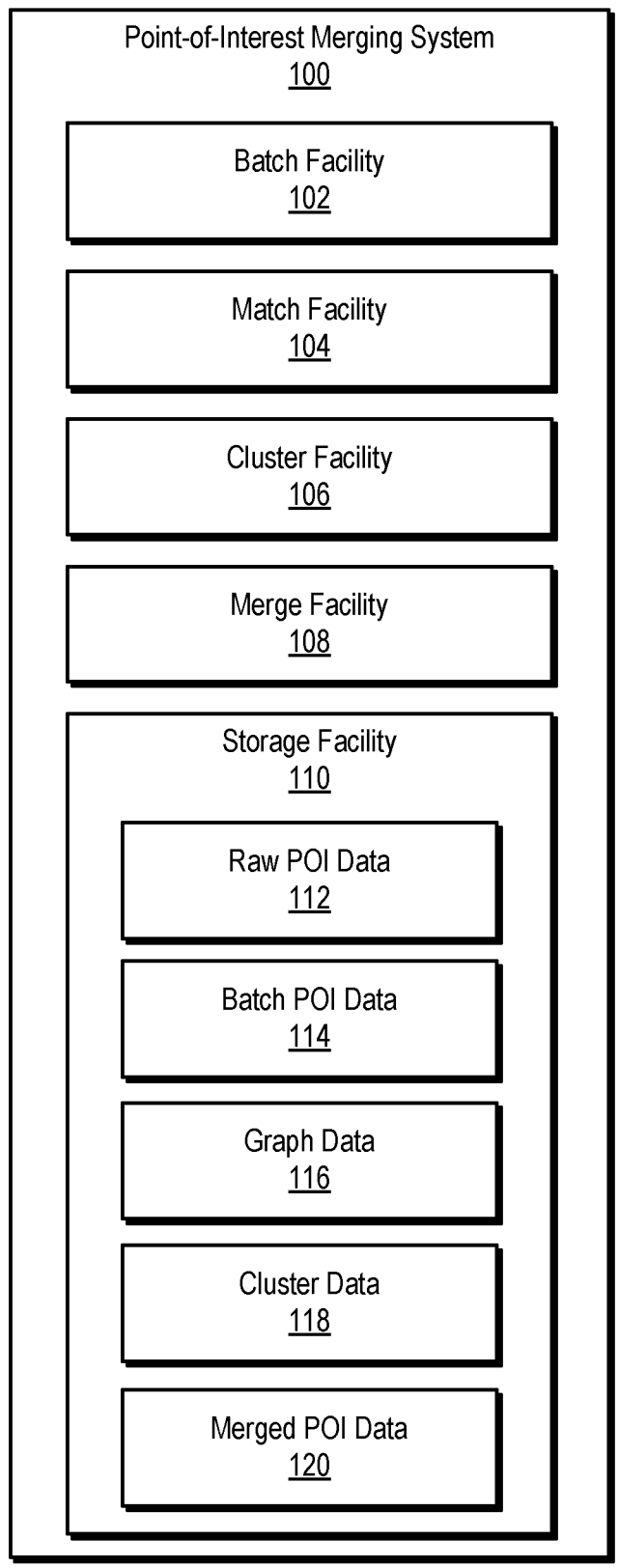
FIG. 1 illustrates an exemplary point-of-interest merging system according to principles described herein.

Methods and systems for merging point-of-interest datasets are described herein. In an example, a point-of-interest merging system may access point-of-interest data records (e.g., point-of-interest data records from different sources). Each point-of-interest data record includes data representative of a distinct set of features for a distinct point-of-interest. The point-of-interest merging system may generate, based on the distinct sets of features of the point-of-interest data records, a graph data structure that includes the point-of-interest data records and weighted feature relationships interconnecting the point-of-interest data records. The point-of-interest merging system may cluster, based on the graph data structure, the point-of-interest data records into groups of point-of-interest data records. Each group of point-of-interest data records may include a different subset of the point-of-interest data records included in the graph data structure. The point-of-interest merging system may generate one or more merged point-of-interest data records based on the clustered groups of point-of-interest data records. In certain examples, the point-of-interest merging system may provide the merged point-of-interest data records to a computer-implemented mapping system for use by the mapping system to indicate one or more points-of-interest on a user interface map of a geographic area.

Methods and systems described herein for merging point-of-interest datasets may provide various benefits, which may include one or more advantages over conventional point-of-interest merging technologies used for computer-implemented mapping systems. For example, by identifying matching points-of-interest across point-of-interest data records in different point-of-interest datasets as described herein, methods and systems described herein may identify matching points-of-interest with improved accuracy and/or efficiency compared to conventional computer-implemented technologies for identifying matching points-of-interest across different point-of-interest datasets. For instance, by generating a graph data structure that includes point-of-interest data records and weighted feature relationships interconnecting the point-of-interest data records, methods and systems described herein may use the graph data structure to accurately and efficiently identify matching point-of-interest data records, such as by using the graph data structure to cluster the point-of-interest data records into subset groups that represent matching point-of-interest data records. Methods and systems described herein may then generate one or more merged point-of-interest data records based on the clustered groups of point-of-interest data records.

In certain examples, methods and systems described herein may facilitate efficient utilization of computing resources. This may improve computer-implemented point-of-interest matching technologies, computer-implemented mapping systems, and/or computer systems that implement the point-of-interest matching technologies and/or mapping systems.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary point-of-interest merging system 100 ("system 100") configured to merge point-of-interest datasets into a merged point-of-interest dataset. As shown, system 100 may include, without limitation, a batch facility 102, a match facility 104, a cluster facility 106, a merge facility 108, and a storage facility 110. Facilities 102 through 110 may be selectively and communicatively coupled to one another using any suitable communication technologies. It will be recognized that although facilities 102 through 110 are shown to be separate facilities in FIG. 1, facilities 102 through 110 may be combined into fewer facilities, such as into a single facility, or divided into more facilities as may serve a particular implementation. In some examples, facilities 102 through 110 may be distributed between multiple devices and/or multiple locations as may serve a particular implementation. Additionally, one or more of facilities 102 through 110 may be omitted from system 100 in certain implementations, while additional facilities may be included within system 100 in the same or other implementations.

Each of facilities 102 through 110 may include or be implemented by computing hardware and/or software components (e.g., processors, memories, communication interfaces, instructions stored in memory for execution by the processors, etc.). The facilities of system 100 may be implemented using separate computing components unique to each facility, or may be implemented using shared computing components.

System 100, including any of the facilities of system 100, may be configured to communicate with one or more external systems using any suitable data communication technologies. As an example, system 100 may be configured to communicate with one or more sources of point-of-interest data such as with computing systems operated by providers of point-of-interest data. Accordingly, system 100 may access point-of-interest data from such sources. As another example, system 100 may be configured to communicate with one or more computer-implemented mapping systems operated by one or more mapping service providers. Accordingly, system 100 may provide merged point-of-interest data to one or more such mapping systems for use to indicate points-of-interest on user interface maps of geographic areas.

The facilities of system 100 may perform one or more of the operations described herein to merge point-of-interest datasets into a merged point-of-interest dataset. For example, system 100 may access point-of-interest data records (e.g., point-of-interest data records included in point-of-interest datasets from different sources), generate, based on distinct sets of features included in the point-of-interest data records, a graph data structure that includes the point-of-interest data records and weighted feature relationships interconnecting the point-of-interest data records, cluster, based on the graph data structure, the point-of-interest data records into subset groups of point-of-interest data records, and generate one or more merged point-of-interest data records based on the clustered groups of point-of-interest data records. The merged point-of-interest data records may be added to a merged point-of-interest dataset. In some examples, system 100 may provide the merged point-of-interest data records to a computer-implemented mapping system for use by the computer-implemented mapping system to indicate one or more points-of-interest on a user interface map of a geographic area.

Each of the facilities of system 100 and exemplary operations that may be performed by the facilities of system 100 to merge point-of-interest datasets into a merged point-of-interest dataset will now be described in more detail.

System 100 (e.g., any facility of system 100) may access raw point-of-interest datasets from different sources. For example, system 100 may access raw point-of-interest datasets from multiple providers of point-of-interest data, such as from computer systems operated by the providers.

A raw point-of-interest dataset may include a plurality of point-of-interest data records representing a plurality of points-of-interest. A point-of-interest may be anything associated with a location and that can be indicated on a user interface map in association with the location. For example, a point-of-interest may include a business, a park, a place of transit, a building, a landmark, etc.

Point-of-interest data records may be in any suitable data format and may include any information about points-of-interest. In particular, each point-of-interest data record may include data representative of a distinct set of features for a distinct point-of-interest. A distinct set of features for a distinct point-of-interest is distinct in the sense that the distinct set of features is represented by a distinct representation of data (e.g., a distinct data record). Distinct sets of features may contain the same or different features. The data representative of the set of features may include any information or values for features of the point-of-interest. Examples of features that may be included in the set of features include a point-of-interest identifier (e.g., a point-of-interest name such as a business name), a point-of-interest street address, a point-of-interest city, a point-of-interest state, a point-of-interest county, a point-of-interest province, a point-of-interest postal code, a point-of-interest country, a point-of-interest geographic location (e.g., GPS coordinates, latitude and longitude coordinates, etc.), a point-of-interest phone number, a point-of-interest email address, a point-of-interest social media identifier, a point-of-interest website, one or more point-of-interest categories, a source of the point-of-interest data record, products or services offered at the point-of-interest, hours of operation of the point-of-interest, and any other information about the point-of-interest.

Point-of-interest data records may differ from one another for a number of reasons. For example, point-of-interest data records may be in different data formats, may include different data fields, may include information for different features of points-of-interest, may be from different sources, and/or may include different data values (e.g., variations in feature values). Thus, even point-of-interest data records that represent a same point-of-interest may be different from one another. Raw point-of-interest data records accessed by system 100 may be stored as raw point-of-interest data 112 in storage facility 110.

Batch facility 102 may be configured to batch point-of-interest data records together based on similarity between a feature shared by point-of-interest data records. The similarity may be defined as any suitable degree of matching between data values of the shared feature, such as an exact match or a defined fuzzy match of the data values. For example, batch facility 102 may process raw point-of-interest data records accessed by system 100 and generate, from the raw point-of-interest data records, a batch of point-of-interest data records that share a similar feature. For instance, batch facility 102 may generate a batch of point-of-interest data records that indicate similar geographic locations (e.g., locations within a threshold distance of a location, locations on the same city block, etc.), point-ofinterest data records that indicate the same or similar postal code, point-of-interest data records that indicate similar point-of-interest names (e.g., fuzzy matched business names such as "Bob's Auto Shop" and "Bob's Auto Body"), or any batch of point-of-interest data records that share at least a threshold similarity in a feature. Batch facility 102 may be configured to batch point-of-interest data records together based on similarity between any single feature or multiple features shared by point-of-interest data records. A batch of point-of-interest data records batched by batch facility 102 may be stored as batch point-of-interest data 114 in storage facility 110.

Batch facility 102 and batching operations are optional and may be included in some implementations and omitted from other implementations. In examples in which batching operations are performed by batch facility 102, batch facility 102 may generate a batch of point-of-interest data records that may be subjected to further processing to identify matching data records. Submission of a batch of point-of-interest data records to further processing (e.g., to operations performed by match facility 104) may facilitate efficient use of computing resources when compared to performing further processing on entire datasets of raw point-of-interest data records.

Match facility 104 may be configured to generate, based on distinct sets of features included in point-of-interest data records, a graph data structure that includes the point-of-interest data records and weighted feature relationships interconnecting the point-of-interest data records. To this end, match facility 104 may compare the distinct sets of features of the point-of-interest data records to one another and generate, based on the comparing, weighted feature relationships that represent relationships between the point-of-interest data records. In certain examples, match facility 104 is configured to generate a weighted feature relationship for each feature in a point-of-interest data record in relation to the same feature in each other point-of-interest data record included in the point-of-interest data records. Data representative of the graph data structure generated by match facility 104 may be stored as graph data 116 in storage facility 110.

Point-of-interest data records included in the graph data structure may still be raw point-of-interest data records. For example, point-of-interest data records in the graph data structure may be unchanged from the raw point-of-interest data records accessed by system 100 from external sources.

In certain examples, a weighted feature relationship included in the graph data structure may represent a degree of similarity of a feature across point-of-interest data records in the graph data structure. To represent the degree of similarity, match facility 104 may generate and assign a weight to the feature relationship based on any defined set of suitable factors. The weight may represent or be used to derive a strength of a relationship between point-of-interest data records.

Match facility 104 may be configured to determine and represent weights of feature relationships in any suitable way, such as by using any suitable scoring scale. In certain examples, match facility 104 may be configured to use different scoring scales for weights of different feature relationships. Examples of such scoring scales include a numerical scale ranging from zero to one, a percentage scale, a geographic distance scale, and any other suitable scale or range of values.

Cluster facility 106 may be configured to cluster, based on a graph data structure generated by match facility 104, point-of-interest data records into subset groups of point-of-interest data records. For example, cluster facility 106 may operate on a graph data structure to identify point-of-interest data records that have similarity to each other and to define the identified point-of-interest data records to be part of a cluster group. Each cluster group of point-of-interest data records may include a different subset of the plurality of point-of-interest data records included in the graph data structure.

Cluster facility 106 may cluster point-of-interest data records into groups based on the weighted feature relationships between the point-of-interest data records. For example, cluster facility 106 may determine strengths of relationships between point-of-interest data records based on the weighted feature relationships between the point-of-interest data records. This may be performed in any suitable way and using any suitable definition of relationship strength. For example, based on a set of weighted feature relationships between two point-of-interest data records, cluster facility 106 may determine an overall strength of a relationship between the two point-of-interest data records. Cluster facility 106 may perform this operation for each different pair of point-of-interest data records in the graph data structure. In some examples, cluster facility 106 may rank the relationships between point-of-interest data records relative to one another based on the determined relationships strengths.

Cluster facility 106 may define subset groups of point-of-interest data records based on the determined strengths of relationships between the point-of-interest data records. For example, cluster facility 106 may cluster strongly related point-of-interest data records into a group (e.g., point-of-interest data records having at least a threshold strength of relationship) and omit less strongly related point-of-interest data records from the group (point-of-interest data records not having at least a threshold strength of relationship). Cluster facility 106 may consider each of the point-of-interest data records until each of the point-of-interest data records are assigned to at least one cluster group. Cluster groups of point-of-interest data records defined by cluster facility 106 be may be stored as cluster data 118 in storage facility 110.

Merge facility 108 may be configured to generate one or more merged point-of-interest data records based on the clustered groups of point-of-interest data records. Merge facility 108 may do this in any suitable way, such as by merging feature data from point-of-interest data records included in a cluster group to form a single, merged point-of-interest data record. The merged point-of-interest data record may include feature data from different point-of-interest data records (e.g., data for one feature may be obtained from one data record, data for another feature may be obtained from a different data record, etc.). This may facilitate generation of a merged point-of-interest data record that includes feature data from the most accurate, up-to-date, and/or reliable data sources for each specific feature.

Merge facility 108 may add the merged point-of-interest data records to a merged point-of-interest dataset. Merged point-of-interest data may be stored as merged point-of-interest data 120 in storage facility 110.

In some examples, system 100 may provide the merged point-of-interest data records or dataset to a computer-implemented mapping system for use by the computer-implemented mapping system to indicate one or more points-of-interest on a user interface map of a geographic area. For example, merge facility 108 may store merged point-of-interest data records in a data store that is accessible to the computer-implemented mapping system.

Storage facility 110 may store and maintain any data received, generated, managed, used, and/or transmitted by facilities 102 through 108 as may serve a particular implementation. As mentioned, for example, storage facility 110 may include raw point-of-interest data 112, batch point-of-interest data 114, graph data 116, cluster data 118, and merged point-of-interest data 120.

Figure 2:
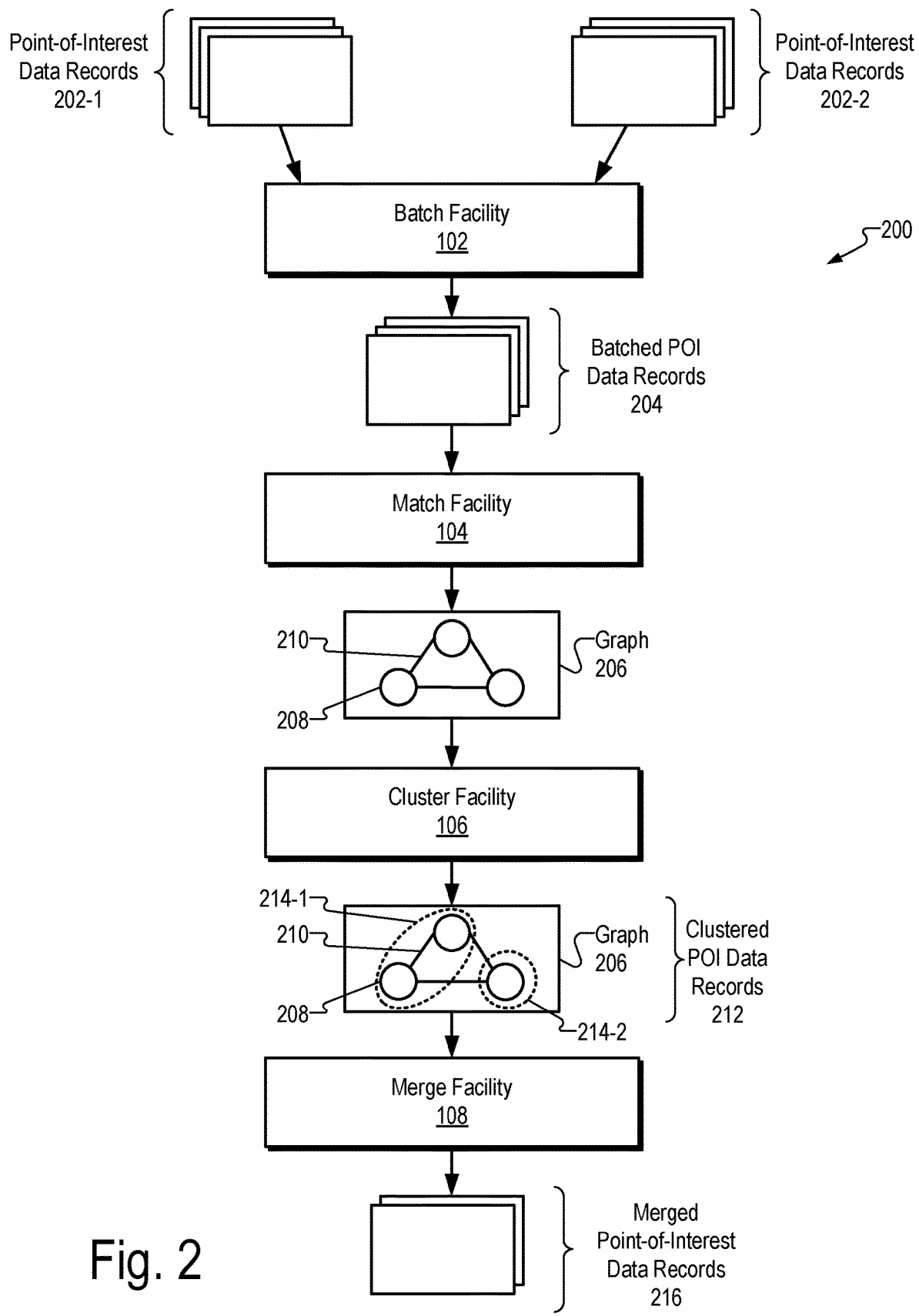
FIG. 2 illustrates an exemplary operation flow performed by system components according to principles described herein.

FIG. 2 illustrates an exemplary operation flow 200 that may be performed by components of system 100. As shown, batch facility 102 may access point-of-interest data records 202 such as point-of-interest data records 202-1 and 202-2, which may be raw point-of-interest data records from different sources. In certain examples, point-of-interest data records 202-1 may be included in a first dataset from a first source, and point-of-interest data records 202-2 may be included in a second dataset from a second source different from the first source. Point-of-interest data records 202 may include any data about points-of-interest, including sets of features for points-of-interest represented by the point-of-interest data records 202.

Batch facility 102 may batch a subset or all of point-of-interest data records 202 together to form a batch of point-of-interest data records 204. Batch facility 102 may batch point-of-interest data records in any suitable way and based on any suitable criteria, such as one or more point-of-interest features indicated by the point-of-interest data records.

Match facility 104 may access and use the batch of point-of-interest data records 204 to generate a graph data structure, such as graph 206, that includes the point-of-interest data records 204 and a plurality of weighted feature relationships interconnecting the point-of-interest data records 204. In graph 206, the point-of-interest data records 204 are nodes, such as node 208, of the graph data structure, and the weighted feature relationships are edges, such as edge 210, of the graph data structure. As shown, the edges interconnect the nodes of the graph data structure.

Based on graph 206, cluster facility 106 may cluster the point-of-interest data records 204 into subset groups to form clustered point-of-interest data records 212. Each cluster group may include a different subset of the point-of-interest data records 204. For example, as shown, a first cluster group 214-1 may include two specific nodes of graph 206, and a second cluster group 214-2 may include one different node of graph 206. Accordingly, the first cluster group 214-1 may include two specific point-of-interest data records represented by the two specific nodes, and the second cluster group 214-2 may include one different point-of-interest data record represented by the one different node.

Merge facility 108 may generate merged point-of-interest data records 216 based on the cluster groups 214. For example, merge facility 108 may generate a first merged point-of-interest data record based on the point-of-interest data records included in the first cluster group 214-1, and a second merged point-of-interest data record based on the point-of-interest data record included in the second cluster group 214-2.

To further illustrate, a simplified example based on a few point-of-interest data records will now be described. The example is illustrative only. One or more principles described with reference to the example apply to examples in which many point-of-interest data records are processed.

Figure 3:
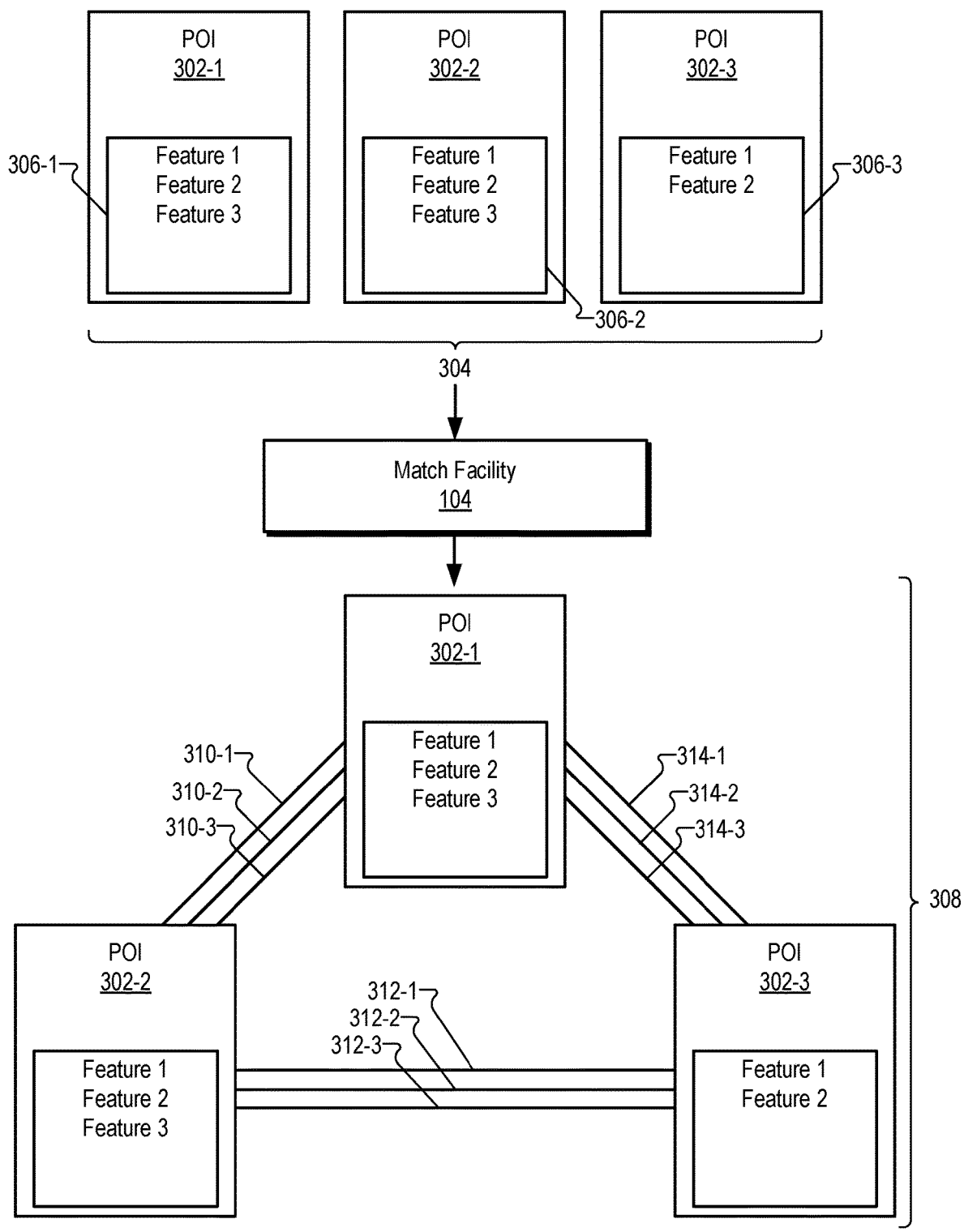
FIG. 3 illustrates an exemplary graph data structure generated from exemplary point-of-interest data records according to principles described herein.

FIG. 3 illustrates exemplary point-of-interest data (POI) records 302-1, 302-2, and 302-3 (collectively "point-of-interest data records 302"). Point-of-interest data records 302 form a set 304 of POI data records, which may be a set of raw point-of-interest data records or a set of batched raw point-of-interest data records.

Each of the point-of-interest data records 302 includes a distinct set of features 306-1, 306-2, and 306-3 (collectively "sets of features 306"). For simplicity, point-of-interest data record 302-1 is shown to include a set 306-1 of three features labeled Feature 1, Feature 2, and Feature 3, point-of-interest data record 302-2 is shown to include a set 306-2 of three features labeled Feature 1, Feature 2, and Feature 3, and point-of-interest data record 302-3 is shown to include a set 306-3 of two features labeled Feature 1 and Feature 2. In other examples, point-of-interest data records 302 may include any number of various features, including features that are used for matching operations of system 100 and features that are not used for matching operations of system 100.

Match facility 104 may access point-of-interest data records 302 and generate a graph data structure 308 based on the point-of-interest data records 302, particularly based on the distinct sets 306 of features included in the point-of-interest data records 302. To this end, match facility 104 may compare the distinct sets 306 of features of the point-of-interest data records 302 to one another and generate, based on the comparing, weighted feature relationships that represent relationships between the point-of-interest data records 302. In certain examples, match facility 104 is configured to generate a weighted feature relationship for each feature in a point-of-interest data record 302 in relation to the same feature in each other point-of-interest data record 302 included in the point-of-interest data records 302.

FIG. 3 shows graph data structure 308 to include sets of weighted feature relationships interconnecting the point-of-interest data records 302. Specifically, a set of weighted feature relationships 310-1, 310-2, and 310-3 (collectively "weighted feature relationships 310") interconnects point-of-interest data records 302-1 and 302-2, a set of weighted feature relationships 312-1, 312-2, and 312-3 (collectively "weighted feature relationships 312") interconnects point-of-interest data records 302-2 and 302-3, and a set of weighted feature relationships 314-1, 314-2, and 314-3 (collectively "weighted feature relationships 314") interconnects point-of-interest data records 302-1 and 302-3.

In certain examples, each weighted feature relationship in a set of feature relationships may be associated with a specific feature and may represent a strength of relationship between the specific feature in one point-of-interest data record and another point-of-interest data record. For example, weighted feature relationship 310-1 may represent a strength of relationship between Feature 1 of point-of-interest data record 302-1 and Feature 1 of point-of-interest data record 302-2, weighted feature relationship 310-2 may represent a strength of relationship between Feature 2 of point-of-interest data record 302-1 and Feature 2 of point-of-interest data record 302-2, and weighted feature relationship 310-3 may represent a strength of relationship between Feature 3 of point-of-interest data record 302-1 and Feature 3 of point-of-interest data record 302-2.

Similarly, with respect to weighted feature relationships interconnecting point-of-interest data records 302-2 and 302-3, weighted feature relationship 312-1 may represent a strength of relationship between Feature 1 of point-of-interest data record 302-2 and Feature 1 of point-of-interest data record 302-3, weighted feature relationship 312-2 may represent a strength of relationship between Feature 2 of point-of-interest data record 302-2 and Feature 2 of point-of-interest data record 302-3, and weighted feature relationship 310-3 may represent a strength of relationship between Feature 3 of point-of-interest data record 302-2 and Feature 3 of point-of-interest data record 302-3. In this case, point-of-interest data record 302-3 may not include Feature 3 or may not include a value for Feature 3, and weighted feature relationship 312-3 may be weighted to represent the value of Feature 3 in point-of-interest data record 302-2 compared to the lack of Feature 3 in point-of-interest data record 302-3. For example, weighted feature relationship 312-3 may be weighted with a zero value to represent a lack of similarity between point-of-interest data records 302-2 and 302-3 with respect to Feature 3.

Similarly, with respect to weighted feature relationships interconnecting point-of-interest data records 302-1 and 302-3, weighted feature relationship 314-1 may represent a strength of relationship between Feature 1 of point-of-interest data record 302-1 and Feature 1 of point-of-interest data record 302-3, weighted feature relationship 314-2 may represent a strength of relationship between Feature 2 of point-of-interest data record 302-1 and Feature 2 of point-of-interest data record 302-3, and weighted feature relationship 314-3 may represent a strength of relationship between Feature 3 of point-of-interest data record 302-1 and Feature 3 of point-of-interest data record 302-3. In this case, point-of-interest data record 302-3 may not include Feature 3 or may not include a value for Feature 3, and weighted feature relationship 314-3 may be weighted to represent the value of Feature 3 in point-of-interest data record 302-1 compared to the lack of Feature 3 in point-of-interest data record 302-3. For example, weighted feature relationship 314-3 may be weighted with a zero value.

Weighted feature relationships included in a set of weighted feature relationships between a pair of POI data records may use the same or different weighting scales. For example, one weighted feature relationship may use a weight scoring scale that includes values between zero and one while another weighted feature relationship may user another weight scoring scale that includes percentage values between zero and one hundred percent. This may allow scoring scales to be tailored to specific features.

A set of weighted feature relationships between a pair of point-of-interest data records may be said to include feature relationships of different types. The different types of relationships may correspond to the respective specific features indicated in the point-of-interest data records.

A simple example of a set of weighted feature relationships between a pair of point-of-interest data records will now be described. In the example, Feature 1 may be a point-of-interest name, Feature 2 may be a point-of-interest phone number, and Feature 3 may be a point-of-interest email address. A first weighted feature relationship between the pair of point-of-interest data records may represent a relationship between the point-of-interest names indicated by the point-of-interest data records, such as whether the point-of-interest names fuzzy match or a degree to which the point-of-interest names fuzzy match across the point-of-interest data records, based on a comparison of the point-of-interest names in accordance with a predefined name-matching heuristic. A second weighted feature relationship between the pair of point-of-interest data records may represent a relationship between the point-of-interest phone numbers indicated by the point-of-interest data records, such as whether the point-of-interest phone numbers match exactly or a degree to which the point-of-interest phone number match across the point-of-interest data records, based on a comparison of the point-of-interest phone numbers in accordance with a predefined phone-number-matching heuristic. A third weighted feature relationship between the pair of point-of-interest data records may represent a relationship between the point-of-interest email address indicated by the point-of-interest data records, such as whether the point-of-interest email addresses fuzzy match or a degree to which the point-of-interest email addresses fuzzy match across the point-of-interest data records, based on a comparison of the point-of-interest email in accordance with a predefined email-matching heuristic. In certain examples, the predefined email-matching heuristic may compare email domains to determine whether there is a match and may be configured to determine that a match exists even when other elements of the email addresses (e.g., user-specific elements) differ.

In certain examples, a set of weighted feature relationships between a pair of point-of-interest data records may collectively indicate a strength of relationship between the point-of-interest data records. In other examples, a set of weighted feature relationships between a pair of point-of-interest data records may be used by system 100 to derive a strength of relationship between the point-of-interest data records.

After matching facility 104 has generated graph data structure 308, matching facility 104 may store the graph data structure 308 to data storage (e.g., to storage facility 110) such that graph data structure 308 is available for access and use by cluster facility 106 to perform clustering operations on the graph data structure 308.

Figure 4:
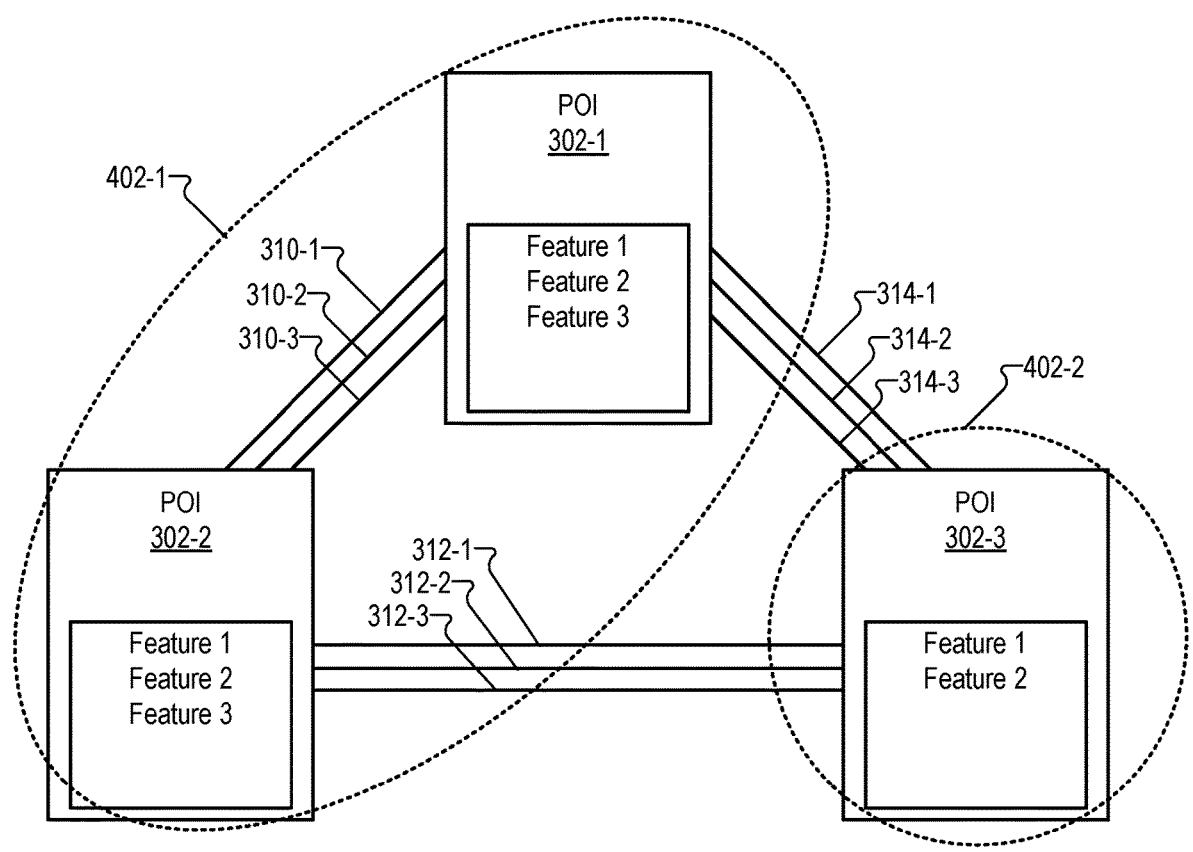
FIG. 4 illustrates an exemplary clustering of point-of-interest data records included in a graph data structure generated according to principles described herein.

FIG. 4 illustrates an exemplary clustering of point-of-interest data records 302 included in graph data structure 308. As shown, a first subset of the point-of-interest data records 302 may be grouped into a first cluster group 402-1, and a second subset of the point-of-interest data records 302 may be grouped into a second cluster group 402-2. Cluster facility 106 may generate cluster groups 402-1 and 402-2 (collectively "cluster groups 402") based on the weighted feature relationships interconnecting the point-of-interest data records 302. For example, based on the set of weighted feature relationships 310 interconnecting point-of-interest data records 302-1 and 302-2, cluster facility 106 may determine a strong relationship to exist between point-of-interest data records 302-1 and 302-2 (e.g., a relationship having a score that satisfies a threshold). Such a relationship may indicate that point-of-interest data records 302-1 and 302-2 are likely to represent the same point-of-interest. Accordingly, cluster facility 106 may define cluster group 402-1 to include point-of-interest data records 302-1 and 302-2.

Based on the set of weighted feature relationships 312 interconnecting POI data records 302-2 and 302-3, cluster facility 106 may determine a weak relationship to exist between point-of-interest data records 302-2 and 302-3 (e.g., a relationship having a score that does not satisfy a threshold). Such a relationship may indicate that point-of-interest data records 302-2 and 302-3 are unlikely to represent the same point-of-interest. Accordingly, cluster facility 106 may create cluster group 402-2 and add point-of-interest data record 302-3 to cluster group 402-2.

Based on the set of weighted feature relationships 314 interconnecting point-of-interest data records 302-1 and 302-3, cluster facility 106 may determine a weak relationship to exist between point-of-interest data records 302-1 and 302-3 (e.g., a relationship having a score that does not satisfy a threshold). Such a relationship may indicate that point-of-interest data records 302-1 and 302-3 are unlikely to represent the same point-of-interest. Accordingly, cluster facility 106 may not add point-of-interest data records 302-1 and 302-3 to a common cluster group.

In certain examples, cluster facility 106 may be configured to determine whether any cluster groups can be combined into a single cluster group. This may be done in any suitable way and based on any suitable predefined criteria.

After cluster facility 106 has defined cluster groups based on the graph data structure 308, cluster facility 106 may store cluster data to data storage (e.g., to storage facility 110) such that graph data structure 308 and the cluster data are available for access and use by merge facility 108 to generate merged point-of-interest data records based on the clustered groups of point-of-interest data records 302 in the graph data structure 308.

Figure 5:
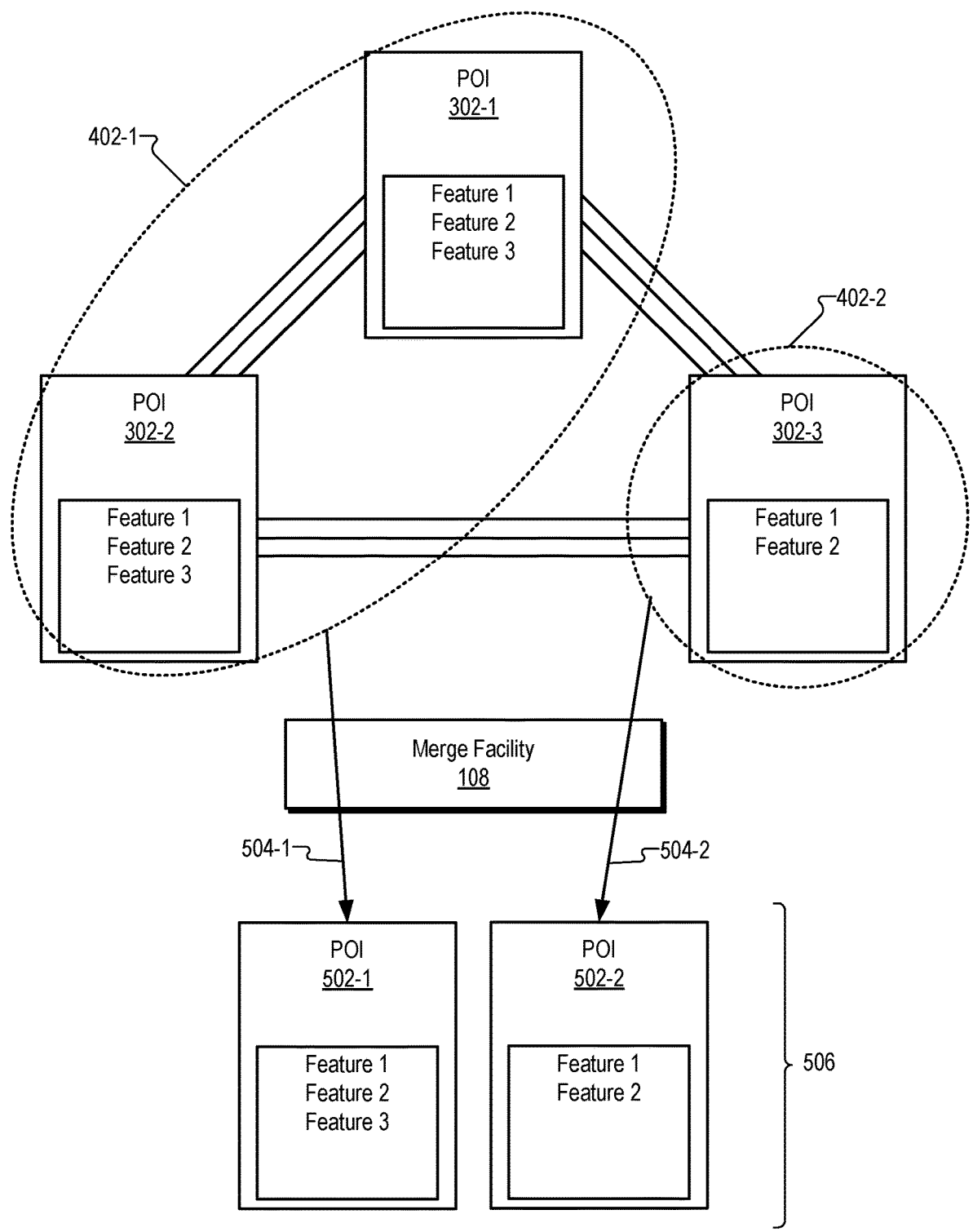
FIG. 5 illustrates exemplary merged point-of-interest data records generated based on cluster groups of point-of-interest data records according to principles described herein.

FIG. 5 illustrates exemplary merged point-of-interest (POI) data records 502-1 and 502-2 (collectively "merged point-of-interest data records 502") generated based on cluster groups 402-1 and 402-2 of point-of-interest data records 302 in the graph data structure 308. Merge facility 108 may generate merged point-of-interest data record 502-1 based on cluster group 402-1 and point-of-interest data record 502-2 based on cluster group 402-2, as indicated by arrows 504-1 and 504-2, respectively. Because point-of-interest data record 302-3 is the only point-of-interest data record in cluster group 402-2, merge facility 108 generates merged point-of-interest data record 502-2 based solely on point-of-interest data record 302-3, such as by creating a copy of or a link to point-of-interest data record 302-3. Because cluster group 402-1 contains point-of-interest data records 302-1 and 302-2, merge facility 108 may generate merged POI data record 502-1 based on one or both of point-of-interest data records 302-1 and 302-2. For example, merge facility 108 may use certain data from point-of-interest data record 302-1 and certain data from point-of-interest data record 302-2 to generate merged POI data record 502-1. For instance, values for Feature 1 and Feature 2 may be accessed from point-of-interest data record 302-1, and a value for Feature 3 may be accessed from point-of-interest data record 302-2 for inclusion in merged point-of-interest data record 502-1. Accordingly, features from both point-of-interest data records 302-1 and 302-2 may be combined to form merged point-of-interest data record 502-1, which may allow point-of-interest data record 502-1 to include the most reliable and/or preferred feature data from either of point-of-interest data records 302-1 and 302-2 and consequently from the most reliable and/or preferred source from which point-of-interest data records 302-1 and 302-2 are accessed.

After merge facility 108 has generated merged point-of-interest data records based on cluster groups 402, merge facility 108 may store the merged point-of-interest data records to data storage (e.g., to storage facility 110) such that the merged point-of-interest data records are available for access and use by a computer-implemented mapping system. For example, merge facility 108 may store merged point-of-interest data records 502-1 and 502-2 as a dataset 506 of merged POI data records.

A specific example of system 100 ingesting a point-of-interest data record and performing batching, matching, and clustering operations will now be described. The specific example is illustrative. Other exemplary operations may be implemented in other examples.

System 100 may ingest a point-of-interest data record and determine whether the point-of-interest data record is new. If the point-of-interest data record is new, system 100 creates a new point-of-interest data record (e.g., a copy of the ingested point-of-interest data record) in a format that is configured for inclusion in a graph data structure. System 100 flags the new point-of-interest data record as ready for batching, matching, and clustering operations.

If the point-of-interest data record is not new, system 100 may determine whether the point-of-interest data record has changed. If the point-of-interest data record has changed, system 100 may update a corresponding point-of-interest data record that has been previously created and stored in a graph data structure. System 100 may then determine if the updates to the point-of-interest data structure will affect matching of the point-of-interest data record (e.g., by determining whether match-specific features or only other features of the point-of-interest data structure have changed). If any feature that will affect matching has been updated, system 100 flags the updated point-of-interest data record as ready for batching, matching, and clustering operations.

Next, system 100 batches the point-of-interest data record by geographic location if the point-of-interest data record indicates a geographic location for the point-of-interest represented by the point-of-interest data record. For example, system 100 may query a data store (e.g., storage facility 110, a previously generated graph data structure, etc.) for points-of-interest that are located within a threshold distance of the geographic location indicated by the point-of-interest data record. System 100 may receive results of the query and filter out any point-of-interest data records that have unreliable geographic location data. System 100 may then batch the point-of-interest data record with the remaining point-of-interest data records returned by the distance-based query.

System 100 may perform match processing on the batch of point-of-interest data records. For example, system 100 may generate weighted feature relationships between the point-of-interest data records based on point-of-interest feature sets of the point-of-interest data records. This may include system 100 applying feature-specific heuristics (e.g., a name-matching heuristic, an address-matching heuristic, etc.) to features of the point-of-interest data records to generate weighted feature relationships between the point-of-interest data records.

Next, system 100 batches the point-of-interest data records by postal code. For example, system 100 may query a data store (e.g., storage facility 110, a previously generated graph data structure, etc.) for points-of-interest that have postal codes that match the postal code of the point-of-interest data record. System 100 may receive results of the query and filter out any point-of-interest data records that have comprehensive geographic location data (e.g., comprehensive addresses) indicative that the corresponding point-of-interest data records have already been batched by geographic location and matched within that batch. System 100 may batch the point-of-interest data record with the remaining point-of-interest data records returned by the postal-code-based query.

System 100 may perform match processing on the batch of point-of-interest data records having matching postal codes. For example, system 100 may generate weighted feature relationships between the point-of-interest data records based on point-of-interest feature sets of the point-of-interest data records. This may include system 100 applying feature-specific heuristics to features of the point-of-interest data records to generate weighted feature relationships between the point-of-interest data records.

System 100 may apply different feature-matching heuristics based on type of batch. For example, system 100 may apply a first set of feature-matching heuristics to a group of point-of-interest data records that are batched based on geographic location and may apply a second set of feature-matching heuristics, different from the first set of feature-matching heuristics, to a group of point-of-interest data records that are batched based on postal code. In certain examples, a batch based on postal-code matching may be subjected to stricter matching criteria because the batch may include a wider range of point-of-interest data records that may have more unrelated or nebulous information compared to a batch based on a geographic location such as street address.

To facilitate use of different feature-matching heuristics based on a batch feature, system 100 may provide data indicating a feature upon which a batch of point-of-interest data records is batched. For example, system 100 may indicate that a batch is based on distances from a geographic location or on a shared postal code.

System 100 may generate weighted feature relationships between the point-of-interest data records included in each batch subjected to match processing. In certain examples, system 100 may label each generated feature relationship to indicate the type of batch that is processed to generate the feature relationship. For example, system 100 may label a generated feature relationship as being based on a geographic location, distance-based batch or on a matching postal code-based batch.

System 100 may generate a graph data structure that includes the point-of-interest data records and weighted feature relationships interconnecting the point-of-interest data records. System 100 may write the generated feature relationships to a graph database. The graph data structure is ready for cluster processing.

System 100 may process active point-of-interest data records in the graph data structure to determine cluster groups of matching point-of-interest data records. For example, system 100 may generate a match score for each pair of the point-of-interest data records based on the set of feature relationships for each pair of the point-of-interest data records. System 100 may be configured to perform the scoring in accordance with any suitable match scoring heuristic.

In certain examples, system 100 may rank the pairs of point-of-interest data records by match score and process each pair in order of rank. For each pair of point-of-interest data records, system 100 may do nothing if both point-of-interest data records are already in a cluster group or may create a new cluster group that contains both point-of-interest data records if neither of the point-of-interest data records is already in a cluster group. If one of the point-of-interest data records is already in a cluster group, system 100 may add the other of the point-of-interest data records to the cluster group if the other point-of-interest data record can be added to the cluster group without causing a conflict with any point-of-interest data record already in the cluster group. If the other point-of-interest data record cannot be added to the cluster group without creating a conflict, system 100 may create a new group and add the other point-of-interest data record as the only member of the cluster group. System 100 may repeat this processing for each pair of point-of-interest data records until all pairs of point-of-interest data records have been processed.

In certain examples, system 100 may then attempt to merge cluster groups by comparing pairings of cluster groups to determine whether sufficient relationships exist between the point-of-interest data records of the two groups to justify a merge of the groups. If the groups can be merged without creating a conflict between point-of-interest data records or without creating excessively loose relationships within one group, system 100 may merge the groups into one group. Otherwise, system 100 will not merge the groups.

System 100 may then finalize the cluster groups and tag each cluster group with an identifier that is determined by hashing identifiers of point-of-interest data records included in the cluster group. System 100 may then update the graph data structure to mark active point-of-interest data records as successfully clustered. The graph data structure may then be used to generate merged point-of-interest data records as described herein.

In certain examples, system 100 may be configured to generate and maintain a graph data structure such as a graph database. The maintenance of the graph data structure may include updating the graph data structure based on new and/or updated point-of-interest data records. To this end, system 100 may perform update operations that may include redoing past matches and cluster groups, such as by deleting or archiving previously generated matches and cluster groups and performing matching and clustering operations on the updated data, which may refresh matches and cluster groups within the graph data structure. This may be referred to as "rematching" and may provide a capability to efficiently and accurately ingest new data without maintaining reliance on matches and clusters that were generated based on previous iterations of data.

In certain examples, system 100 may be configured to flag each point-of-interest data record that is new or updated. The flagging may be performed at any suitable point in a process, including when system 100 generates a graph data structure. The flag is configured to signal to cluster facility 106 to re-cluster the new or updated point-of-interest data record because its relationships in the graph data structure may have changed, which might lead to a change in cluster groups. Cluster facility 106 may search the graph data structure, identify point-of-interest data records that are new or updated, and redefines clusters for the identified point-of-interest data records. The redefinition of a cluster for a point-of-interest data record may include cluster facility 106 identifying relationships that the point-of-interest data record has with other point-of-interest data records, identifying relationships that the other point-of-interest data records have with yet other point-of-interest data records, and so on until an expansion boundary is reached. The expansion boundary may be an actual boundary of a cluster or a predefined computational limit.

In certain examples, system 100 may be configured to perform matching and clustering operations in a manner that adds a historical dimension to the matching and clustering, such as by considering past iterations of matches and cluster groups. For example, system 100 may archive previous iterations of graph data structures (e.g., weighted feature relationships, matches, and cluster groups defined by graph data structures) and use any of the archived historical information when determining new graph data structures (e.g., new weighted feature relationships, matches, and cluster groups defined by graph data structures). To illustrate, two point-of-interest data records from two different providers may represent the same point-of-interest and may indicate the same address for the point-of-interest. One of the providers may update the address for the point-of-interest. System 100 may determine based on historical data that a point-of-interest data record received from the provider and that includes the updated address matches a point-of-interest data record received from another provider and that still includes the old address.

In certain examples, system 100 may be configured to use machine learning technologies for one or more operations.

Any suitable machine learning technologies may be used, such as one or more trained neural networks (e.g., a convolutional neural network) and/or other machine learning heuristics. To illustrate an example, system 100 may be configured to generate a graph data structure that is configured to be used as input to a machine learning heuristic that is configured to determine clusters of point-of-interest data records based on the graph data structure. Cluster facility 106 may implement the machine learning heuristic and may apply the machine learning heuristic to the graph data structure to define cluster groups within the graph data structure.

Figure 6:
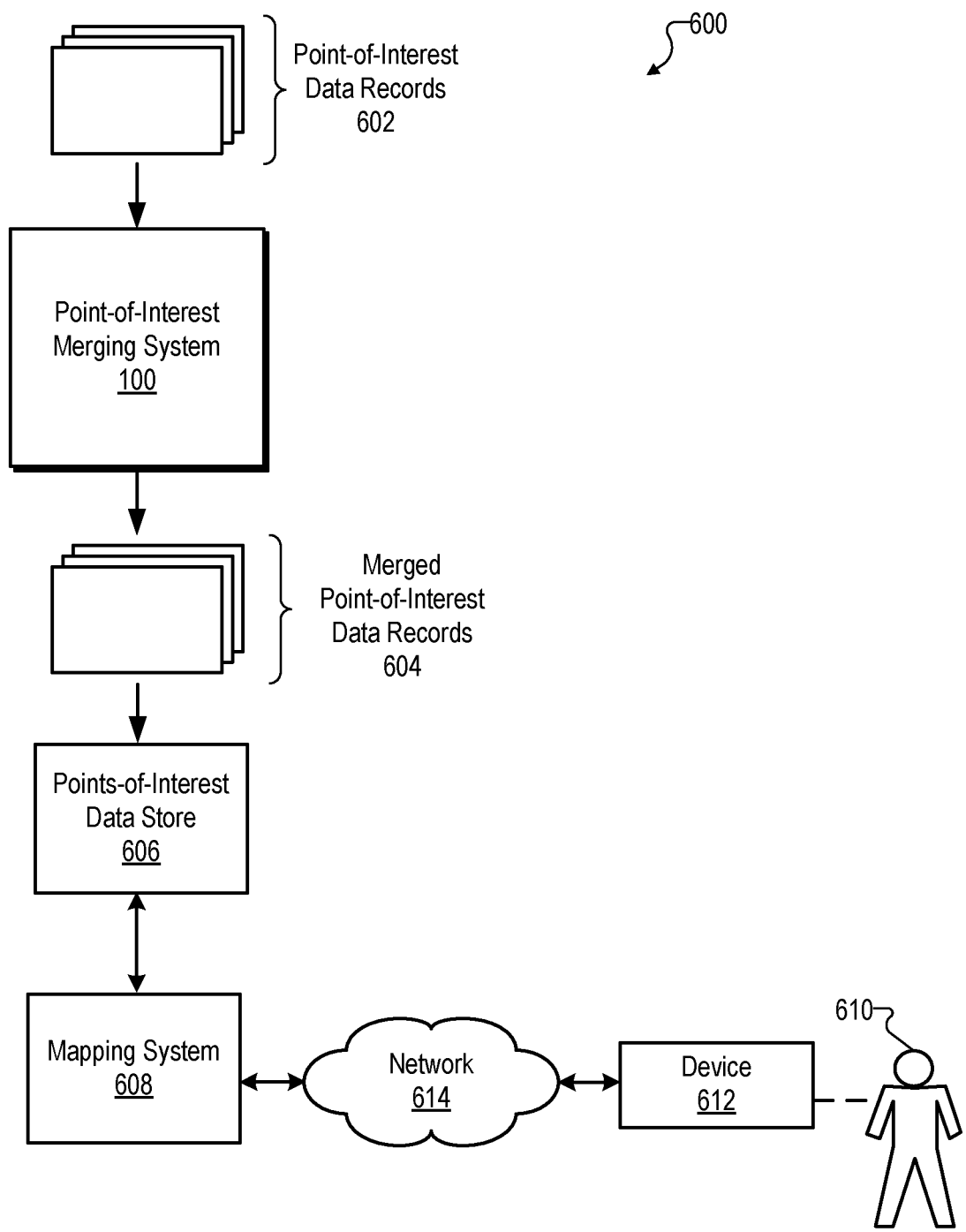
FIG. 6 illustrates an exemplary configuration in which a point-of-interest merging system may operate to merge point-of-interest data records according to principles described herein.

FIG. 6 illustrates an exemplary configuration 600 in which system 100 may operate to merge point-of-interest data records. For example, system 100 may access point-of-interest data records 602 and perform operations of system 100 on the point-of-interest data records 602 as described herein to generate merged point-of-interest data records 604. System 100 may provide the merged point-of-interest data records 604 as output that may be stored in a points-of-interest data store 606.

A computer-implemented mapping system 608 may access the merged point-of-interest data records 604 within the points-of-interest data store 606 and utilize the merged point-of-interest data records 604 to provide one or more representations of one or more points-of-interest to a user 610 via a computing device 612 ("device 612") and a network 614. For example, mapping system 608 and/or device 612 may provide a user interface map for display and that includes indications of one or more points-of-interest in a geographic area.

As shown, mapping system 608 may be communicatively coupled with device 612 by way of network 614. Mapping service system 608 and device 612 may communicate one with another by way of network 614. Network 614 may include a wireless local area network (e.g., a Wi-Fi network), a provider-specific wired or wireless network (e.g., a cable or satellite carrier network, a mobile telephone network, etc.), the Internet, a wide area network, a content delivery network, and/or any other suitable network or networks. Accordingly, data may flow between mapping system 608 and device 612 by way of network 614 using any communication technologies, devices, media, and protocols as may serve a particular implementation.

Device 612 may be implemented as any suitable computing device able to be operated, by user 610, to view a user interface map and/or search results provided by mapping system 608. For example, device 612 may be a mobile phone (e.g., a smartphone), a tablet device, a laptop computer, a personal computer, a wearable computing device, a navigational device, or the like configured to receive data representative of a user interface map and/or search results provided by mapping system 608 to device 612 via network 614.

Mapping system 608 and/or device 612 may be configured to provide one or more user interface features (e.g., user interface tools) that are associated with system 100. As an example, mapping system 608 and/or device 612 may provide a user interface feature that is configured to use data generated by system 100, such as a graph data structure and/or clusters generated by system 100. As another example, mapping system 608 and/or device 612 may provide a user interface feature that is configured to receive user input and apply the user input to data generated by system 100, such as a graph data structure and/or clusters generated by system 100.

In certain examples, mapping system 608 and/or device 612 may provide one or more user interface tools for use by user 610 to manually change a merged point-of-interest data record. In certain examples, mapping system 608 and/or device 612 may provide one or more user interface tools for use by user 610 to search point-of-interest data. Search searches may include searches of historical data maintained by system 100, the results of which may be used to provide additional search functionality that is based on previous versions of graph data structures, weighted feature relationships, clusters, and point-of-interest data records. To illustrate, user 610 may search for a point-of-interest at an address. Mapping system 608 may search current and historical data generated by system 100 and determine that there is a newly updated address for the point-of-interest. Mapping system 608 may notify user 610 of this finding, such as by asking user 610 if his or her intent is to search for the point-of-interest at the new address.

In certain examples, system 100 may be configured to provide a user interface and one or more user interface features for use by a user of system 100. As an example, system 100 may provide one or more user interface tools for use by a user to modify a graph data structure, such as by modifying weighted feature relationships (e.g., adding, deleting, re-weighting weighted feature relationships). To illustrate one example, the user may add a manually-defined relationship to the graph data base. System 100 may append the manually-defined relationship to the graph, which will affect clustering performed after the manually-defined relationship has been added. To illustrate another example, the user may delete a relationship or a determined match between point-of-interest data records.

As another example, system 100 may provide one or more user interface tools for use by a user to access and view a history of operations performed by system 100. For example, system 100 may provide historical data that may be presented in a user interface and that may indicate operations such as matching and clustering operations that have been performed over a time period. Such information may indicate an addition of a new point-of-interest data record to a graph data structure, a clustering of the new point-of-interest data record, etc.

Figure 7:
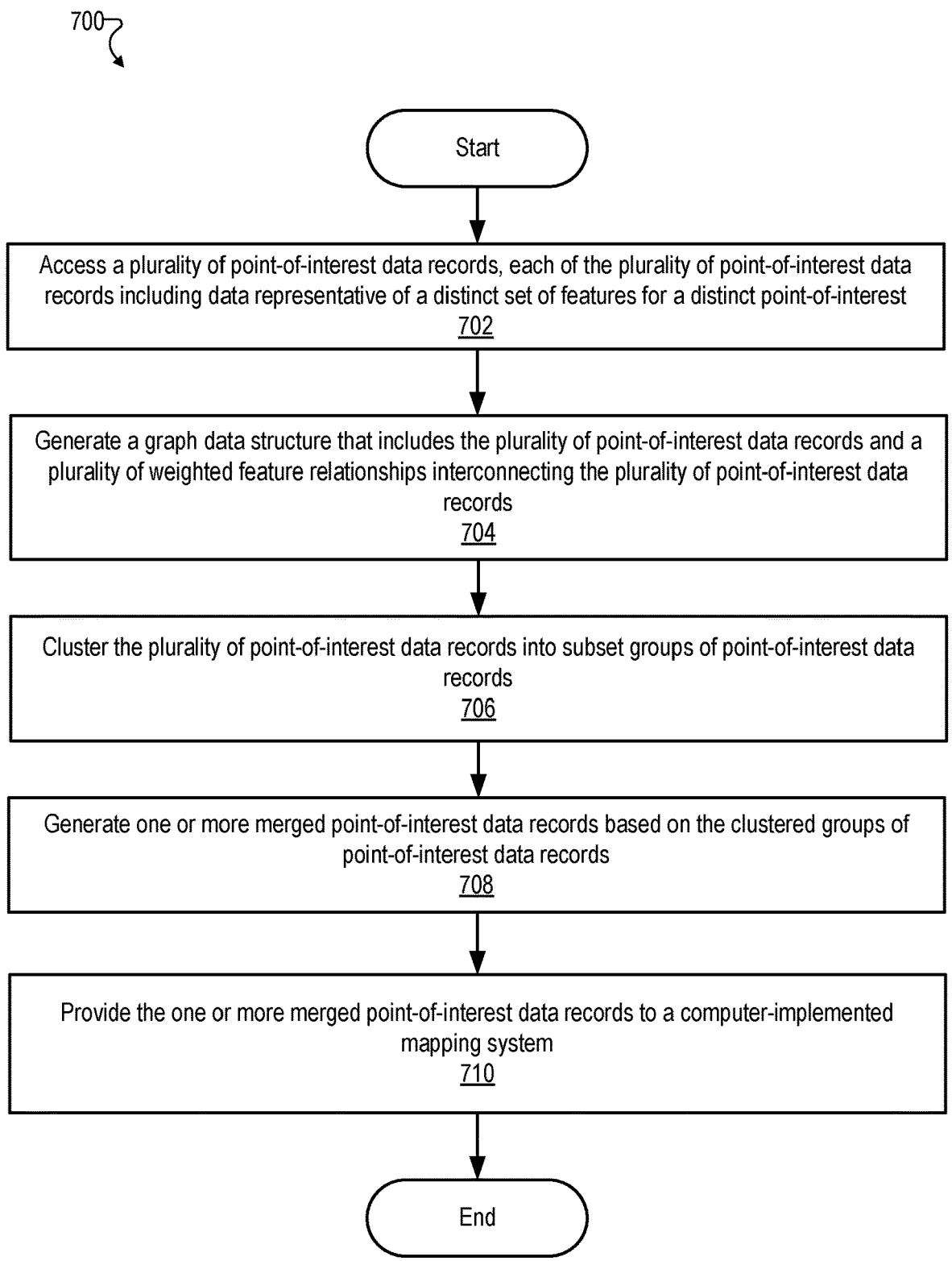
FIG. 7 illustrates an exemplary method of merging point-of-interest datasets according to principles described herein.

FIG. 7 illustrates an exemplary method 700 for merging point-of-interest datasets. While FIG. 7 illustrates exemplary operations according to one embodiment, other embodiments may omit, add to, reorder, and/or modify any of the operations shown in FIG. 7. One or more of the operations shown in FIG. 7 may be performed by a specially configured computing system such as system 100, any components included in system 100, and/or any implementation of system 100.

In operation 702, a computing system accesses a plurality of point-of-interest data records. Each of the plurality of point-of-interest data records includes data representative of a distinct set of features for a distinct point-of-interest. The computing system may access the point-of-interest data records from multiple different sources. The sources may be sources external to system 100 and/or a mapping system configuration in some examples. In other examples, one source may be internal to system 100 and/or a mapping system configuration (e.g., an internal database storing point-of-interest data records) and one or more sources external to system 100 and/or a mapping system configuration. Operation 702 may be performed in any of the ways described herein.

In operation 704, the computing system generates a graph data structure that includes the plurality of point-of-interest data records and a plurality of weighted feature relationships interconnecting the plurality of point-of-interest data records. The computing system may generate the graph data structure based on the distinct sets of features of the plurality of point-of-interest data records. Operation 704 may be performed in any of the ways described herein.

In operation 706, the computing system clusters the plurality of point-of-interest data records into subset groups of point-of-interest data records. The computing system may perform the clustering based on the graph data structure, and particularly based on the weighted feature relationships interconnecting the plurality of point-of-interest data records in the graph data structure. Each subset group of point-of-interest data records may include a different subset of the plurality of point-of-interest data records in the graph data structure. Operation 706 may be performed in any of the ways described herein.

In operation 708, the computing system generates one or more merged point-of-interest data records based on the clustered groups of point-of-interest data records. Operation 708 may be performed in any of the ways described herein.

In operation 710, the computing system provides the one or more merged point-of-interest data records to a computer-implemented mapping system. In alternative examples, the computing system may provide the one or more merged point-of-interest data records to any other computing system. Operation 710 may be performed in any of the ways described herein.

Figure 8:
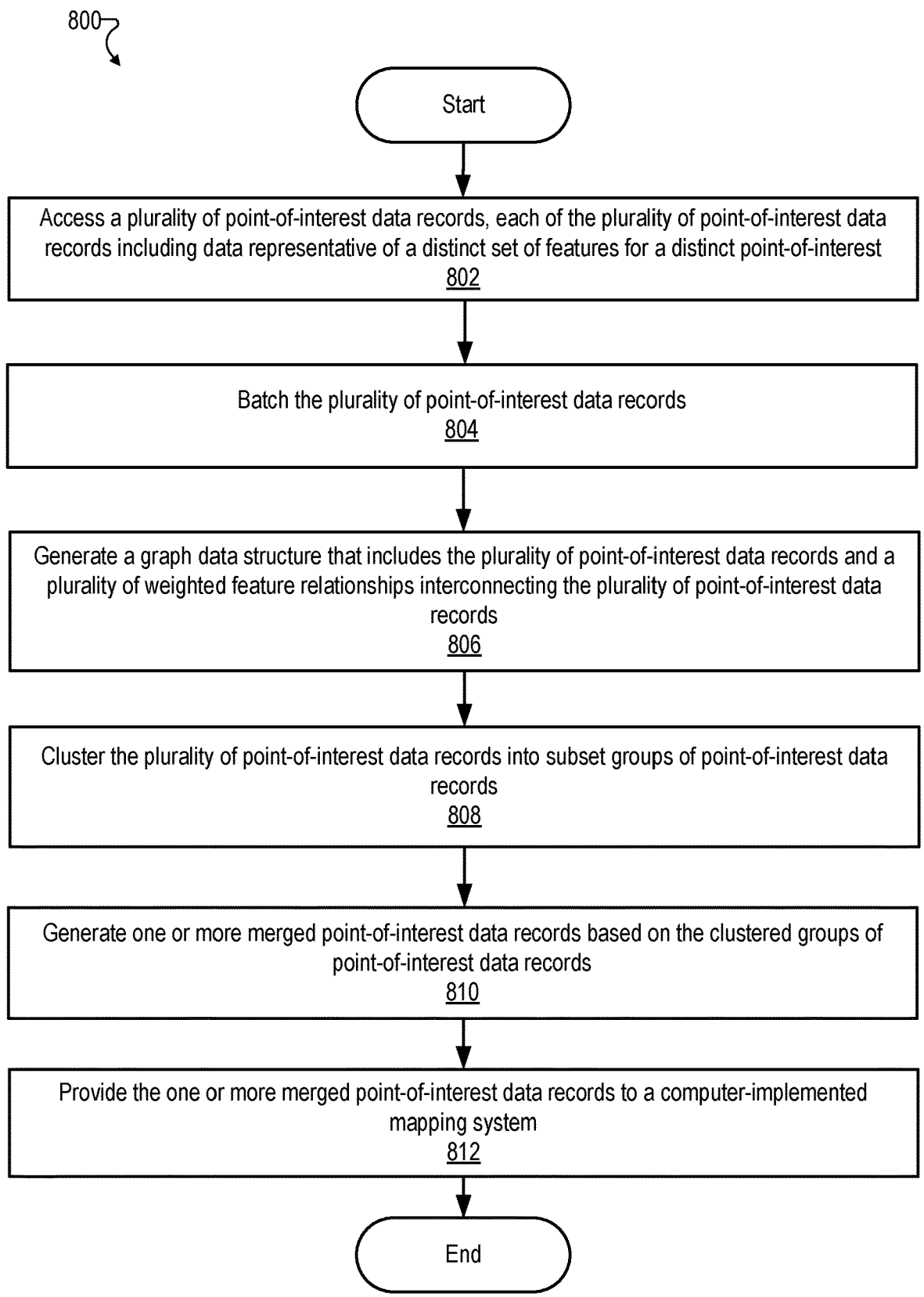
FIG. 8 illustrates another exemplary method of merging point-of-interest datasets according to principles described herein.

FIG. 8 illustrates an exemplary method 800 for merging point-of-interest datasets. While FIG. 8 illustrates exemplary operations according to one embodiment, other embodiments may omit, add to, reorder, and/or modify any of the operations shown in FIG. 8. One or more of the operations shown in FIG. 8 may be performed by a specially configured computing system such as system 100, any components included in system 100, and/or any implementation of system 100. Method 800 may be the same as method 700 except that method 800 includes a batching operation.

In operation 802, a computing system accesses a plurality of point-of-interest data records. The accessed plurality of data records may be included in distinct datasets accessed from different sources. Operation 802 may be performed in any of the ways described herein.

In operation 804, the computing system batches the plurality of point-of-interest data records. Operation 804 may be performed in any of the ways described herein.

In operation 806, the computing system generates a graph data structure that includes the plurality of point-of-interest data records and a plurality of weighted feature relationships interconnecting the plurality of point-of-interest data records. The computing system may generate the graph data structure based on the distinct sets of features of the plurality of point-of-interest data records. Operation 806 may be performed in any of the ways described herein.

In operation 808, the computing system clusters the plurality of point-of-interest data records into subset groups of point-of-interest data records. The computing system may perform the clustering based on the graph data structure, and particularly based on the weighted feature relationships interconnecting the plurality of point-of-interest data records in the graph data structure. Each subset group of point-of-interest data records may include a different subset of the plurality of point-of-interest data records in the graph data structure. Operation 808 may be performed in any of the ways described herein.

In operation 810, the computing system generates one or more merged point-of-interest data records based on the clustered groups of point-of-interest data records. Operation 810 may be performed in any of the ways described herein.

In operation 812, the computing system provides the one or more merged point-of-interest data records to a computer-implemented mapping system. In alternative examples, the computing system may provide the one or more merged point-of-interest data records to any other computing system. Operation 812 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer may read.

Figure 9:
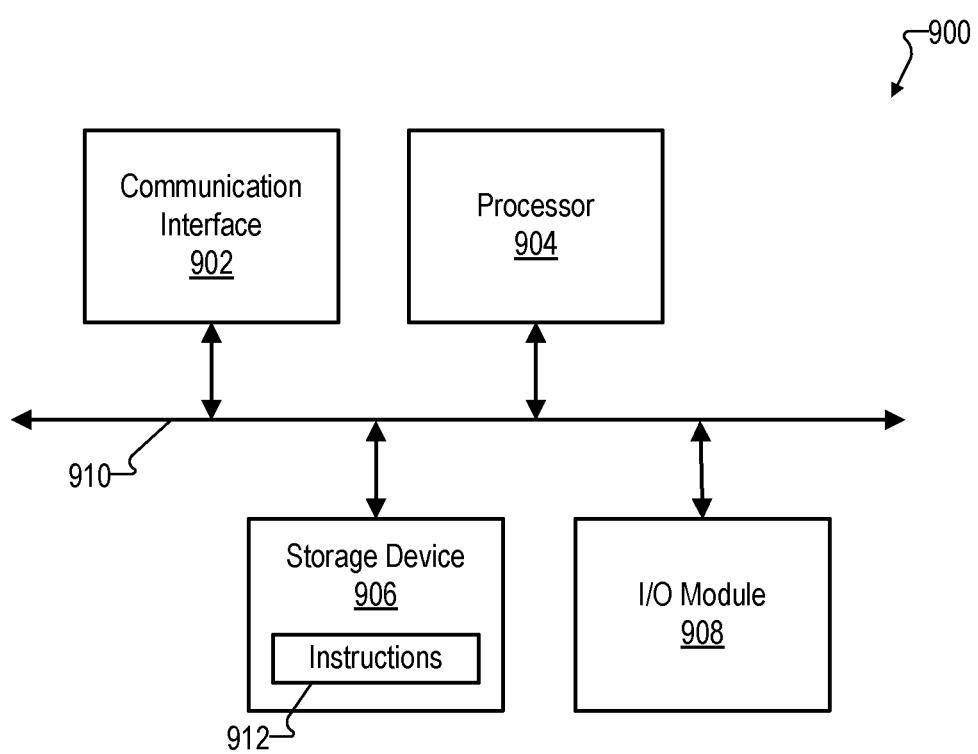
FIG. 9 illustrates an exemplary computing device according to principles described herein.

FIG. 9 illustrates an exemplary computing device 900 that may be specifically configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with facilities 102 through 108 of system 100. Likewise, storage facility 110 of system 100 may be implemented by or within storage device 906.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   accessing, by a computing system communicatively coupled to systems operated by providers of point-of-interest data, a plurality of point-of-interest data records from the systems, each of the plurality of point-of-interest data records including data representative of a distinct set of features for a distinct point-of-interest associated with a distinct geographic location;
   generating, by the computing system and based on the plurality of point-of-interest data records, a graph data structure that includes a plurality of nodes representing the plurality of point-of-interest data records and a plurality of edges representing a plurality of weighted feature relationships interconnecting the plurality of point-of-interest data records;
   generating, by the computing system based on the graph data structure, one or more merged point-of-interest data records; and
   storing, by the computing system, the one or more merged point-of-interest data records to a points-of-interest data store in a storage device for access and use by a computer-implemented mapping system to indicate one or more points-of-interest on a display of a user interface map of a geographic area.

2. The method of claim 1, wherein the generating of the one or more merged point-of-interest data records comprises:
   clustering, by the computing system based on the graph data structure, the plurality of point-of-interest data records into groups of point-of-interest data records, each group of point-of-interest data records including a different subset of the plurality of point-of-interest data records; and
   generating, by the computing system, the one or more merged point-of-interest data records based on the clustered groups of point-of-interest data records.

3. The method of claim 2, wherein the clustering of the plurality of point-of-interest data records into the groups of point-of-interest data records comprises:
   determining, based on the plurality of weighted feature relationships interconnecting the plurality of point-of-interest data records, strengths of relationships between the plurality of point-of-interest data records; and
   defining the groups of point-of-interest data records based on the strengths of relationships between the plurality of point-of-interest data records.

4. The method of claim 1, wherein the generating of the graph data structure comprises:
- comparing the distinct sets of features of the plurality of point-of-interest data records to one another; and
- generating the plurality of weighted feature relationships interconnecting the plurality of point-of-interest data records based on the comparing.

5. The method of claim 1, wherein the distinct set of features for a point-of-interest data record of the plurality of point-of-interest data records comprises a point-of-interest street address.

6. The method of claim 1, further comprising providing, by the computer-implemented mapping system and based on the merged point-of-interest data records stored in the points-of-interest data store, the user interface map of the geographic area for display, the user interface map indicating the one or more points-of-interest at one or more locations within the geographic area.

7. The method of claim 1, wherein the one or more points-of-interest comprise one or more businesses.

8. The method of claim 1, wherein the one or more points-of-interest comprise one or more places of transit.

9. The method of claim 1, wherein the plurality of weighted feature relationships comprises a set of multiple weighted feature relationships interconnecting a first point-of-interest data record and a second point-of-interest data record included in the plurality of point-of-interest data records.

10. The method of claim 9, wherein the set of multiple weighted feature relationships interconnecting the first point-of-interest data record and the second point-of-interest data record comprises:
- a first weighted feature relationship representing a strength of relationship between a first specific feature in the first point-of-interest data record and the first specific feature in the second point-of-interest data record; and
- a second weighted feature relationship representing a strength of relationship between a second specific feature in the first point-of-interest data record and the second specific feature in the second point-of-interest data record, the second specific feature different from the first specific feature.

11. A system comprising:
a processor configured to:
- access, from systems operated by providers of point-of-interest data, a plurality of point-of-interest data records, each of the plurality of point-of-interest data records including data representative of a distinct set of features for a distinct point-of-interest associated with a distinct geographic location;
- generate, based on the plurality of point-of-interest data records, a graph data structure that includes a plurality of nodes representing the plurality of point-of-interest data records and a plurality of edges representing a plurality of weighted feature relationships interconnecting the plurality of point-of-interest data records;
- generate, based on the graph data structure, one or more merged point-of-interest data records; and
- store the one or more merged point-of-interest data records to a points-of-interest data store in a storage device for access and use by a computer-implemented mapping system to indicate one or more points-of-interest on a display of a user interface map of a geographic area.

12. The system of claim 11, wherein generating the one or more merged point-of-interest data records comprises:
- clustering, based on the graph data structure, the plurality of point-of-interest data records into groups of point-of-interest data records, each group of point-of-interest data records including a different subset of the plurality of point-of-interest data records; and
- generating the one or more merged point-of-interest data records based on the clustered groups of point-of-interest data records.

13. The system of claim 12, wherein clustering the plurality of point-of-interest data records into the groups of point-of-interest data records comprises:
- determining, based on the plurality of weighted feature relationships interconnecting the plurality of point-of-interest data records, strengths of relationships between the plurality of point-of-interest data records; and
- defining the groups of point-of-interest data records based on the strengths of relationships between the plurality of point-of-interest data records.

14. The system of claim 11, wherein generating the graph data structure comprises:
- comparing the distinct sets of features of the plurality of point-of-interest data records to one another; and
- generating the plurality of weighted feature relationships interconnecting the plurality of point-of-interest data records based on the comparing.

15. The system of claim 11, wherein the distinct set of features for a point-of-interest data record of the plurality of point-of-interest data records comprises a point-of-interest street address.

16. The system of claim 11, the processor is further configured to provide, based on the merged point-of-interest data records stored in the points-of-interest data store, the user interface map of the geographic area for display, the user interface map indicating the one or more points-of-interest at one or more locations within the geographic area.

17. A non-transitory computer-readable medium storing instructions that, when executed, direct at least one processor of a computing device to:
- access, from systems operated by providers of point-of-interest data, a plurality of point-of-interest data records, each of the plurality of point-of-interest data records including data representative of a distinct set of features for a distinct point-of-interest associated with a distinct geographic location;
- generate, based on the plurality of point-of-interest data records, a graph data structure that includes a plurality of nodes representing the plurality of point-of-interest data records and a plurality of edges representing a plurality of weighted feature relationships interconnecting the plurality of point-of-interest data records;
- generate, based on the graph data structure, one or more merged point-of-interest data records; and
- store the one or more merged point-of-interest data records to a points-of-interest data store in a storage device for access and use by a computer-implemented mapping system to indicate one or more points-of-interest on a display of a user interface map of a geographic area.

18. The non-transitory computer-readable medium of claim 17, wherein generating the one or more merged point-of-interest data records comprises:
- clustering, based on the graph data structure, the plurality of point-of-interest data records into groups of point-of-interest data records, each group of point-of-interest data records including a different subset of the plurality of point-of-interest data records; and generating the one or more merged point-of-interest data records based on the clustered groups of point-of-interest data records.

19. The non-transitory computer-readable medium of claim 18, wherein clustering the plurality of point-of-interest data records into the groups of point-of-interest data records comprises:

determining, based on the plurality of weighted feature relationships interconnecting the plurality of point-of-interest data records, strengths of relationships between the plurality of point-of-interest data records; and defining the groups of point-of-interest data records based on the strengths of relationships between the plurality of point-of-interest data records.

20. The non-transitory computer-readable medium of claim 17, wherein generating the graph data structure comprises:

comparing the distinct sets of features of the plurality of point-of-interest data records to one another; and generating the plurality of weighted feature relationships interconnecting the plurality of point-of-interest data records based on the comparing.

* * * * *